(12) United States Patent
Kaito et al.

(10) Patent No.: US 6,797,952 B2
(45) Date of Patent: Sep. 28, 2004

(54) SCANNING ATOM PROBE

(75) Inventors: Takashi Kaito, Chiba (JP); Osamu Nishikawa, Ishikawa (JP); Takaya Yagyu, Ishikawa (JP)

(73) Assignees: SII NanoTechnology Inc., Chiba (JP); Kanazawa Institute of Technology, Ishikawa (JP)

( * ) Notice: Subject to any disclaimer, the term of this patent is extended or adjusted under 35 U.S.C. 154(b) by 0 days.

(21) Appl. No.: 10/205,919

(22) Filed: Jul. 26, 2002

(65) Prior Publication Data

US 2003/0066962 A1 Apr. 10, 2003

(30) Foreign Application Priority Data

Jul. 31, 2001 (JP) ........................................ 2001-231304

(51) Int. Cl.[7] .......................... G01N 23/00; G21K 7/00
(52) U.S. Cl. ...................... 250/306; 250/201.3; 73/105; 369/126
(58) Field of Search ............................. 250/201.3, 306, 250/307; 73/105; 369/126

(56) References Cited

U.S. PATENT DOCUMENTS

| | | | | |
|---|---|---|---|---|
| 5,353,632 A | * | 10/1994 | Nakagawa | .................... 73/105 |
| 5,689,494 A | * | 11/1997 | Ichikawa et al. | ............ 369/126 |
| 5,923,637 A | * | 7/1999 | Shimada et al. | ............. 369/126 |
| 5,965,218 A | * | 10/1999 | Bothra et al. | ................ 427/578 |
| 6,201,226 B1 | * | 3/2001 | Shimada et al. | ......... 250/201.3 |
| 6,333,497 B2 | * | 12/2001 | Shimada et al. | ......... 250/201.3 |
| 6,457,350 B1 | * | 10/2002 | Mitchell | ...................... 73/105 |
| 6,580,069 B1 | * | 6/2003 | Cerezo | ....................... 250/287 |

\* cited by examiner

Primary Examiner—John Lee
Assistant Examiner—Paul M. Gurzo
(74) Attorney, Agent, or Firm—Adams & Wilks

(57) ABSTRACT

According to the invention, in selecting an analyzed area of a scanning atom probe (SAP), there is adopted a method of using a tip of the lead-out electrode of SAP as a scanning probe of a scanning tunneling microscope (STM) and drawing a surface shape of a sample to thereby select the analyzed area and with regard to the tip of the lead-out electrode of SAP, there is formed an exclusive probe in a needle-like shape by a CVD micromaching technology or a lithographic method using focused ion beam in order to promote accuracy of the scanning probe of STM. Further, a conical dome of a conductive material is formed at the tip of the conical electrode mechanically formed by using a CVD fabricating method using focused ion beam and the tip is shaped by sputter etching to thereby form the lead-out electrode near to an ideal shape.

15 Claims, 6 Drawing Sheets

3 ION OPTICAL SYSTEM
   CONDENSER LENS
   BEAM BLANKER
   ALIGNER
   APERTURE
   OBJECTIVE LENS

VARIOUS CONTROL SIGNALS
   ACCELERATION VOLTAGE
   ION OPTICAL SYSTEM
   DEFLECTION SCAN
   GAS SUPPLY
   SAMPLE STAGE DRIVE

SCANNING ATOM PROBE

BACKGROUND OF THE INVENTION

The present invention relates to an improvement in a lead-out electrode of a scanning atom probe.

One type of high resolution microscope utilizing a tunnel phenomenon of electrons is a field emission microscope (FEM), that irradiates electrons from a sharp needle tip for observing a radiated electron image which is enlargedly projected (refer to FIG. 5). The microscope utilizes an electric field radiation phenomenon in which a strong electric field is applied under a vacuum state, and electrons are emitted from a surface of a metallic conductor by passing over a barrier or a surface potential by a quantum-mechanical tunnel effect and has a construction in which electrons are radiated from a surface of a tip of a metal formed in a needle-like shape toward a screen coated with a fluorescent substance by operation of the strong electric field, and an enlarged image of a surface of the irradiated metal is projected on the fluorescent screen.

Although a single atom cannot be observed since the resolution of a FEM is as low as about 1 nm, a work function of a fine crystalline face on a semispherical face of the needle tip from an I-V characteristic between a negative voltage applied to the needle and a radiation current. When the voltage applied to the needle is switched from negative to positive and an inert gas at low pressure is introduced into a chamber, the FEM is operated as a field ion microscope (FIM) and an atomic arrangement at the needle tip can directly be observed. The FIM is provided with a characteristic capable of orderly desorbing a surface atom at the needle tip as a positive ion by an electric field evaporation phenomenon. The phenomenon is utilized also for atomic operation by a scanning tunneling microscope (STM). When the desorbed ion is successively detected and identified, the composition of the needle tip can be analyzed at an atomic level. Based on this concept, there has been developed a composite atom probe (AP) of a mass spectroscopy instrument capable of detecting a single ion and a FIM. The AP is the only apparatus capable of analyzing an electron state, an atomic arrangement and a composition distribution of the needle tip. The electric field evaporation is progressed orderly from a first layer of the surface atomic layer by atomic layer and therefore, there can be investigated a composition of respective layers, a composition distribution of an interface and a change in an electron state.

However, since the semispherical face of the sharp needle tip having a radius of curvature equal to or smaller than 100 nm, constitutes an observed an analyzed area, the sample is constituted by polishing a slender wire having a diameter equal to or smaller than 0.2 $\mu$m or an end of an rectangular column having a side equal to or smaller than 0.5 $\mu$m by a chemical or electrochemical method or by irradiating and Polishing an electron or ion beam. Only a metallic or semiconductor material can be subjected to such a step and it is not easy to apply the step to a conductive organic material, ceramic, or diamond. Further, in the case of a superlattice structure comprising a multi-layered film having a thickness of about 1 nm having different compositions, a thickness of a total thereof is only about 1 $\mu$m even when one thousand layers thereof are laminated. It is almost impossible to polish the superlattice structure by cutting out the superlattice structure in a slender rectangular shape along with a matrix thereof while leaving the superlattice structure at the needle tip. Further, it is not easy to analyze a surface where corrosion or catalytic reaction is progressed as it is. Further, according to research and development of an electron source of a next generation closely arranged with very small needles having a height of several $\mu$m in a $\mu$m order, which attracts attention, it is necessary to investigate a shape, a radiation characteristic, a composition distribution and operational life of each needle tip. Although AP is optimum for the research, when voltage is applied to the closely assembled needles, although an electric field intensity of the needle tip becomes higher than that on a planer electrode at same voltage, the electric field intensity is far lower than an electric field of a long and sharp single needle tip by a difference in the order and it is not easy to subject atom of the needle tip to electric field evaporation. Further, even when the atom is subjected to electric field evaporation, also an ion evaporated from a contiguous needle tip is incident on a detector and therefore, the composition of the individual needle tip cannot separately be analyzed.

As described above, there is a strict restriction on AP in fabrication and shape of the sample and a field capable of making full use of the characteristic is limited. It is a scanning atom probe (SAP) that is devised in order to break through the restriction.

In order to select a specific needle from closely arranged needles and investigate a tip thereof, an electric field needs to localize to the needle tip. Hence, a very small grounded lead-out electrode in a funnel shape is attached to inside of a cabinet of AP and positive voltage is applied to a planar sample closely arranged with very small needles. Then, a high electric field is generated at a single needle tip disposed right below a hole having a diameter of several $\mu$m to several tens $\mu$m at a tip of the lead-out electrode and the electric field is localized in an extremely narrow space between the hole and the needle tip. According to a calculation of an electric field distribution by a computer, even in the case of an apex angle of a needle tip of 90° and a radius of curvature of a tip of 50 nm, a high electric field required for electric field radiation or electric field evaporation is generated at a needle tip. The fact shows that when there are recesses and projections of about several $\mu$m on a flat sample face, a tip of the projection can be analyzed. A surface which is not subjected to a smoothing process, a corroded surface, such a surface of a highly efficient catalyst or the like is normally enriched with recesses and projections and therefore, such a surface can be investigated as it is.

FIG. 6 shows a basic structure of SAP. A sample at a left end of the drawing schematically shows an electric field radiation electron source of a closely assembled arrangement type. When a hole of a tip of a lead-out electrode of a funnel type approaches a needle tip or a tip of a projection on a sample face, a high electric field is generated at an extremely narrow area between the tip and the electrode, and electron radiated from the needle tip projects an FEM image on a screen. Further, when an inert image gas such as helium is introduced into a cabinet and positive voltage is applied to the sample, a high resolution FIM image is projected on the screen. Further, when surface atom is subjected to electric field evaporation by superposing pulse voltage on steady-state voltage or irradiating pulse laser beam to the sample surface, the surface atom evaporated as a positive ion, enters a reflectron constituting a mass spectroscopy instrument by passing through a survey hole at a center of the screen and is successively detected. An analyzed area is an area having a diameter of several nanometers through several tens nanometers at a tip of a projection in correspondence with the survey hole. When the analysis is continued, a change in a composition in a depth direction of the area can be investigated with a resolution of a single atomic layer.

Meanwhile, a lead-out electrode of SAP currently used, is mechanically fabricated by producing a very small projection at platinum foil by deep drawing. There poses a problem that a shape of a tip of an electrode fabricated in this way, constitutes a shape of a large sphere and cannot be miniaturized sufficiently. As a result, there cannot be concentrated an electric field for constituting an object to be analyzed only by a specific projection on a sample and only a specific projection aimed at by ASP cannot selectively analyzed. That is, there poses a problem that a specific projection cannot individually analyzed when projections are closely assembled on a surface.

FIG. 1 shows an image produced by observing a lead-out electrode of SAP which is mechanically fabricated by a scanning ion microscope and the lead-out electrode is formed such that a height dimension of a dome portion thereof is 200 $\mu$m and a radius of a spherical face at a tip thereof is about 30 $\mu$m. An analyzed position limiting function in this case is about several tens $\mu$m in correspondence with a radius of the spherical face at the tip of the lead-out electrode. In order to enhance the analyzed position limiting function, a dimension of the tip of the lead-out electrode may be reduced.

Further, there also are poses a problem that it is not easy to select an analyzed area of a scanning atom probe(SAP). In the case of the atom probe, what constitutes an object of an analysis is, in principle, a projected shape portion of a sample. Even when SAP is of a scanning type, a two-dimensional image is not provided by scanning the probe as in other scanning microscope. Although the lead-out electrode can be scanned two-dimensionally, the scanning is for selecting a proper positional relationship with the projected shape portion and individual analysis is carried out with regard to a single very small projected portion of a sample face. It is necessary to specify the single very small projected portion and position the lead-out electrode. Therefore, as previous preparation, a surface shape of a sample face is grasped beforehand by using a scanning tunneling microscope and an analyzed area is selected, however, thereby, STM needs to prepare other than an SAP apparatus, further, it is necessary to transmit positional information provided by STM as positional information of SAP and the execution is not necessarily easy.

The advantage of the present invention is to provide a scanning atom probe apparatus capable easily executing selection of an analyzed area by providing a technology capable of grasping a shape of a sample face similar to a sample face of a scanning tunneling microscope without separately preparing the scanning tunneling microscope, prior to analysis by a scanning atom probe (SAP), further, capable of analyzing only a specific projection on the sample by confining an electric field formed between the sample and the lead-out electrode to a narrow range by providing an electrode machining technology capable of forming a sufficiently small funnel type shape.

SUMMARY OF THE INVENTION

According to the invention, in selecting an analyzed area of a scanning atom probe (SAP), there is adopted a method of using a tip of a lead-out electrode of the SAP as a scanning probe of a scanning tunneling microscope (STM) and selecting the analyzed area by drawing a surface shape of a sample. Further, with regard to the tip of the lead-out electrode of SAP, there is formed an exclusive probe of a needle-like shape by CVD micromachining technology using a focused ion beam or a lithographic method in order to promote accuracy of the scanning probe of STM.

Further, according to the scanning atom probe of the invention, in order to make an electric field formed between a sample and the lead-out electrode uniform and accurate and make accuracy of the microscope high, there is formed a lead-out electrode near to an ideal shape by forming a conical dome of a conductive material at a tip of a conical electrode mechanically formed by CVD machining process using focus ion beam and shaping a tip thereof by sputter etching.

Further, a scanning atom probe system according to the invention is provided with a function by which positional information of STM corresponds uniquely as positional information of SAP by providing a composite electrode formed with a projection constituting an STM probe at a circular-ring-like tip of a lead-out electrode, a display for displaying a surface image of a sample provided by an STM function, means for selecting an area analyzed by SAP on the display and a drive mechanism for moving the sample or the lead-out electrode in correspondence with selected position information from the means for selecting the analyzed area.

DESCRIPTION OF THE REFERENCE NUMERALS AND SIGNS

Figure 1:
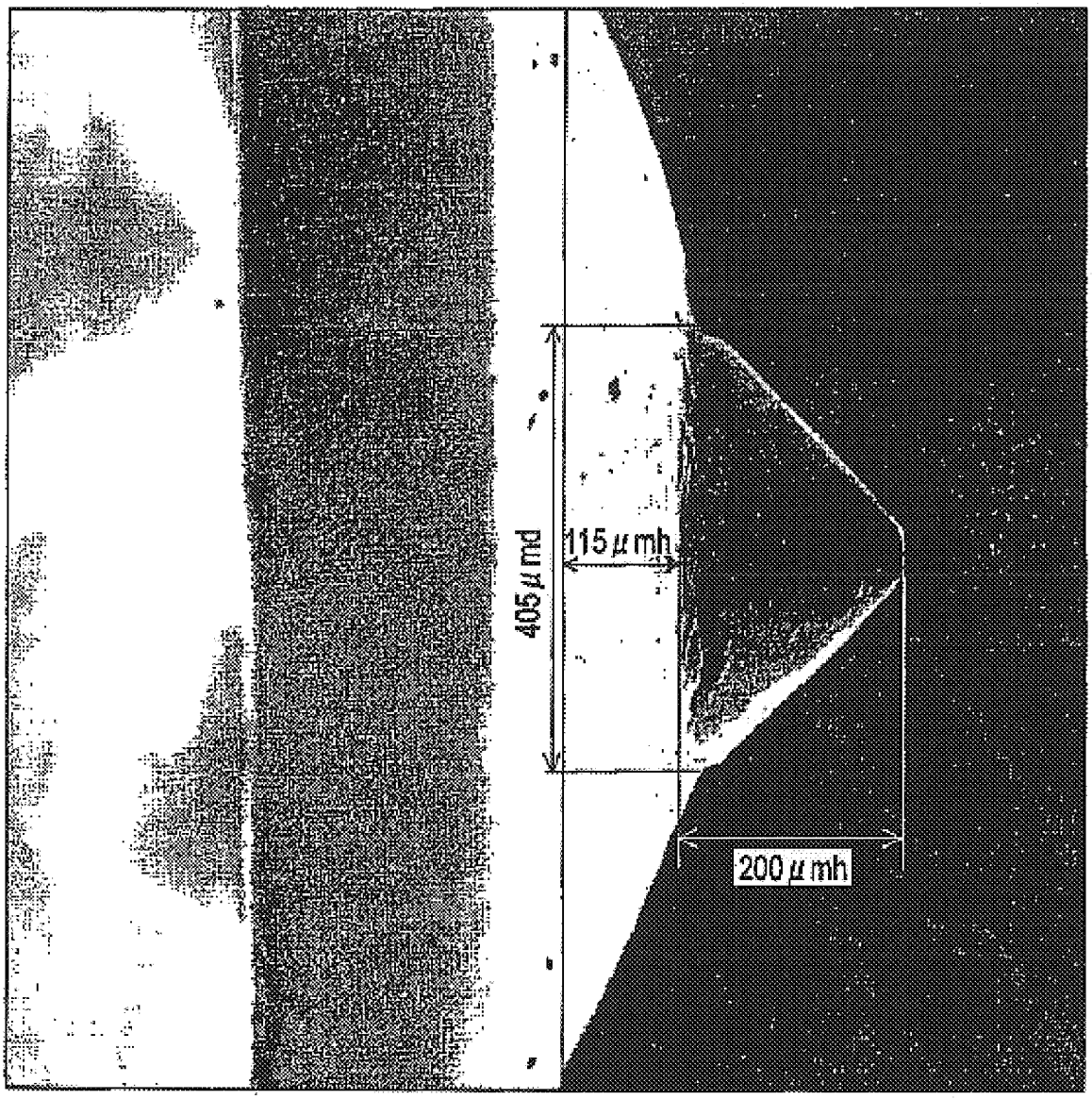
FIG. 1 shows a scanning ion microscope image of a lead-out electrode a tip of which is trimmed by sputter etching after forming a platinum foil into a shape of a conical dome by deep drawing.

1 platinum dome, 2 carbon dome, 3 center hole portion, 4 STM probe, 5 conductive coating, 6 gas gun, 7 sample stage, 8 charge neutralizer, 9 sample, 11 display, 12 input operating portion, 71 ion source, 72 ion beam, 73 ion optical system, 74 deflector, 75 secondary charged particle

DETAILED DESCRIPTION OF THE INVENTION

A scanning atom probe according to the invention is an apparatus constituting an object by a very small projection of a micrometer or a submicrometer level present on a surface of a sample and analyzing the very small projection and in analyzing the very small projection, a very small lead-out electrode is made to be closely opposed to the very small projection of the sample intended to analyze in a vacuum state and when negative high voltage is applied the sample, a local strong electric field is generated therebetween and atom at the surface of the very small projection of the sample is ionized and led out. The scanning atom probe is an ultimate analyzing apparatus capable of analyzing a three-dimensional atomic structure of a sample by subjecting the ions to element analysis one by one. As one of current problems concerning the scanning atom probe, a method of selecting an analyzed area needs to establish and a lead-out electrode having an ideal shape needs to fabricate in order to promote accuracy. As a measure for resolving the former, it is conceivable to detect a projected shape portion suitable for analysis by other microscope means such as an electron microscope, a scanning tunneling microscope or an atomic force microscope in order to enable to select the analyzed area and grasp a shape thereof, which is not limited to pure metal or special alloy. However, for such purpose, it is necessary to separately prepare these means, further, there poses a problem that positional information of a microscope image provided by these means needs to convert and correspond to positional information in analyzing the area by the scanning atom probe. Hence, the inventors have conceived to resolve the problem by constituting a composite system by integrating other microscope means to a scanning atom probe. Further, as a measure for the latter, the inventors have conceived to fabricate the lead-out electrode near to an ideal shape by using the newest micromachining technology. Specifically, the lead-out electrode for planarly scanning the sample in a state of being proximate thereto, is used to serve also as a probe of a scanning tunneling microscope. That is, according to the invention, the two problems are dealt with by a technology of composite formation and precision machining of the lead-out electrode.

The inventors have investigated a surface structure of an analyzed area of a SAP by providing an STM image obtained by an STM by providing a lead-out electrode of the SAP with means for detecting a tunnel current. However, the lead-out electrode of the SAP is fabricated by forming a conical dome having a base diameter of 350 $\mu$m, an apex angle of 85 degrees and a tip radius of about 30 $\mu$m by subjecting a platinum thin film having a thickness of about 25 $\mu$m to deep drawing by pressing a sharp corner of a diamond, flattening a tip portion by sputter etching and perforating a hole of about 30 $\mu$m at a center thereof. The lead-out electrode produced by such a mechanical fabrication is not sufficiently miniaturized yet and when very small projections of the sample are proximate to each other, each thereof cannot be analyzed separately. Further, since the tip of the lead-out electrode is produced by mechanical fabrication, a circular-ring-like portion thereof is not constituted by a complete flat face but is constituted by a shape of recesses and projections microscopically. When the lead-out electrode is used as a probe of STM and an electric field is applied between the lead-out electrode and the sample face, tunnel current flows between a projection in the circular-ring-like tip mostly proximate to the sample face and the sample face, however, a projection at a shortest distance from a sample face which is not a completely flat face, does not always stay to be the same projection. The shortest distance may be constituted between other projection and the sample face depending on a relative positional relationship with the sample face and tunnel current may flow therebetween. This signifies that a position of the probe of the STM is provided with an uncertain factor of an amount of a diameter of 5 thorough 60 $\mu$m of the circular-ring-like portion of the lead-out electrode. Therefore, an image provided thereby is not so distinct as an image inherently drawn by the STM.

Figure 7:
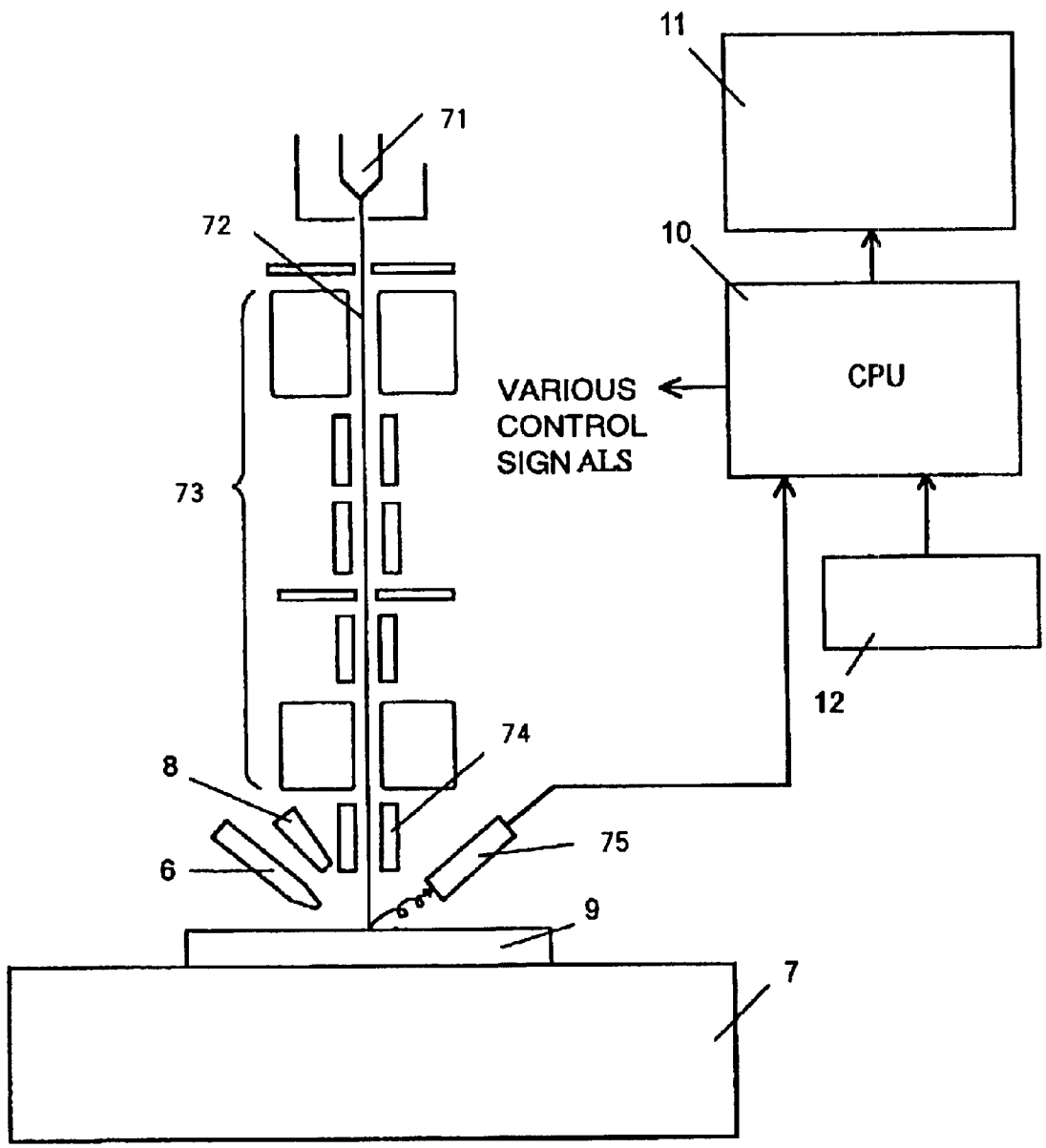
FIG. 7 is a view showing a basic constitution of focused ion beam used in fabrication of the invention.

In view of the fact that the cause resides in the reason described above, in that a position of the probe of the STM is not determined, the inventors have conceived of a method of forming a needle-like probe portion or micro extraction electrode (otherwise referred to as a hollow conical dome) at the circular-ring-like tip of the lead-out electrode to dispose at a specific portion of the circular-ring-like tip of the lead-out electrode by using precision fabrication technology. The inventors have conceived that as a fabrication method capable of realizing such fabrication, there is applicable a lithographic method or a chemical vapor deposition (CVD) fabricating method using focused ion beam (FIB) of the type applied in the field of a semiconductor device fabrication. Particularly, an FIB-CVD method is regarded as optimum in order to form a needle shape for a probe of STM and fabrication by the method is carried out. The FIB-CVD method provides a phenomenon in which in a focused ion beam apparatus, the basic constitution of which is shown in FIG. 7, when an ion beam focused by an ion optical system is irradiated to a sample mounted on a sample stage in a vacuum while injecting a raw material gas via a gas gun, a certain component in the raw material gas is deposited to an irradiated area of a sample face. According to the newest FIB-CVD method, there is developed a technology of realizing fabrication of forming desired ultra fine three-demensional shape by an attitude control of three-dimension drive of a sample stage added with rotation and inclination and injecting a raw material gas and irradiating an ion beam to a tip of a formed deposited layer (Japanese Patent Application No. 2000-363573 'Method and apparatus of forming ultra fine three-dimensional structure')and the technology is applicable. Since the probe needs to be conductive, there are formed probes of carbon (artificial diamond) using phenanthrene [$C_{14}H_{10}$] as a raw material gas and tungsten using hexacarbonyltungsten [$W(CO)_6$]. Although the former is superior in view of ease of fabrication and mechanical strength, the latter is superior in view of conductivity. Therefore, tungsten is adopted by determining that tungsten is suitable as a material of a probe of an STM. When fabrication is carried out by setting beam current to about 0.3 through 1 pA, in the case of tungsten, the growth speed of a projection is about 10 nm/second. In the case of a tungsten probe having a height of 1 $\mu$m and a diameter of 80 nm, the tungsten probe can be formed in about 100 seconds.

Figure 2:
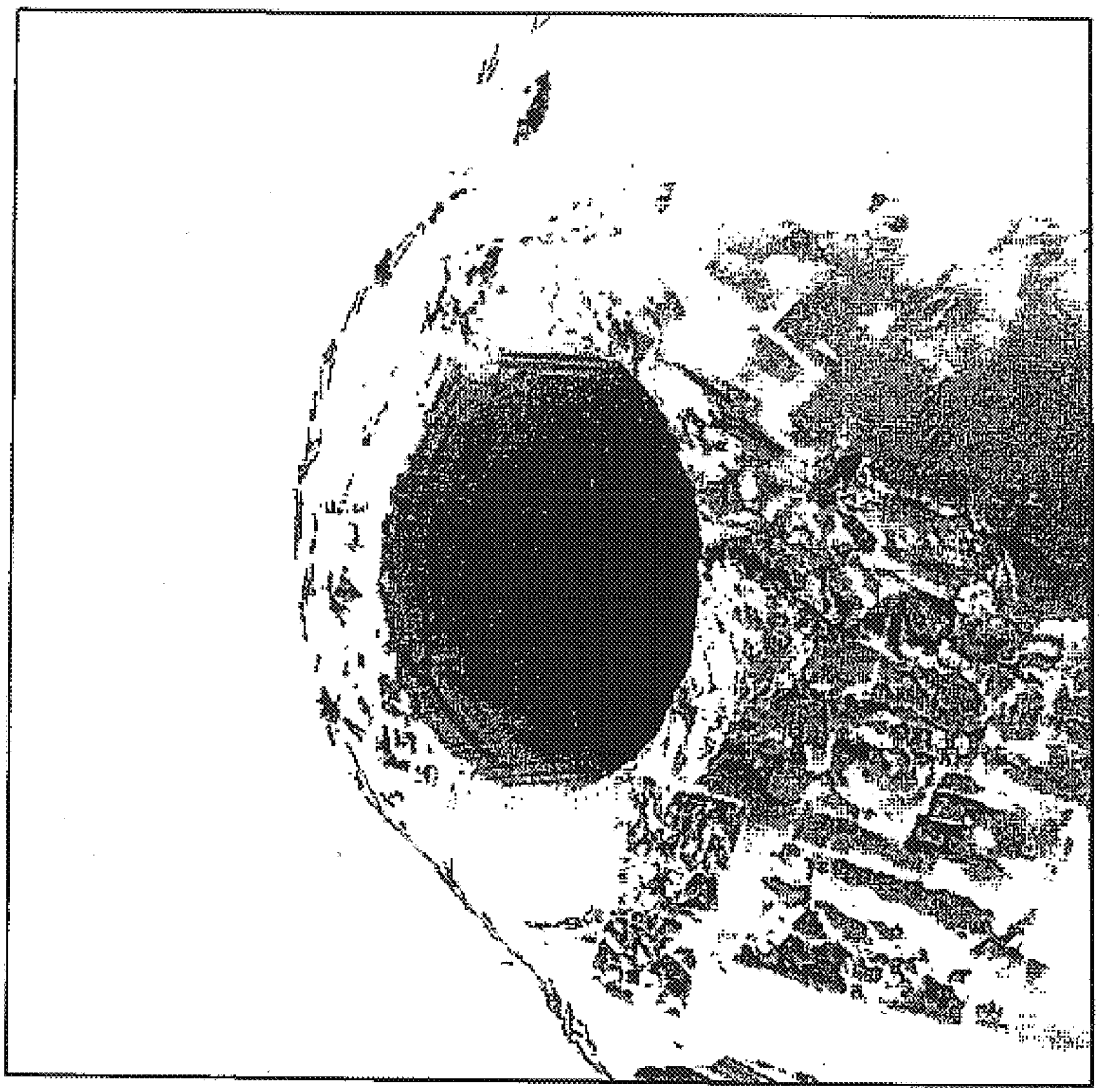
FIG. 2 shows a scanning ion microscope image displayed to enlarge the tip in a circular ring shape of the lead-out electrode of FIG. 1.
Figure 4A:
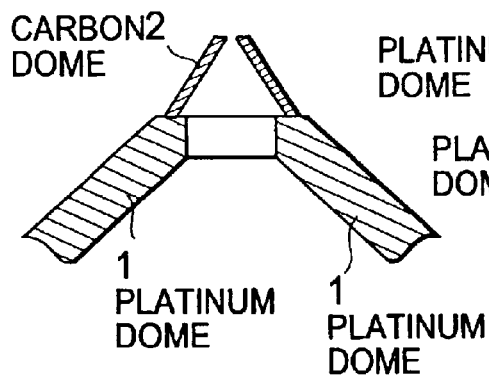
FIGS. 4A through 4C are views for explaining a procedure of fabricating the lead-out electrode according to the invention and FIG. 4D is a view schematically showing the lead-out electrode according to the invention having the STM probe.

Next, the inventors have conceived to adopt a precision machining method using focused ion beam as means for forming a shape of the lead-out electrode effecting serious influence on the analysis accuracy as the atom probe, that is, an ideal funnel shape, particularly, accurately machining a shape of a tip of the lead-out electrode opposed to the sample face in a shape of a flat circular ring having a small diameter. FIG. 2 shows an image of a scanning ion microscope in which the lead-out electrode is formed by conventional mechanical fabrication, a tip portion (diameter of about 40 $\mu$m) is flattened by sputter etching using focused ion beam and an inner face of a center hole is trimmed. According to the example, an inner wall face having a diameter of 32 $\mu$m of a center hole portion is neatly machined as illustrated by carrying out sputter etching while circularly scanning focused ion beam by deflection control. However, even in the case of the trimmed electrode, as is known from the microscope image, recesses and projections of crystalline faces remain at the surface of platinum and also the size of the diameter cannot be regarded as sufficient for selecting and specifying a very small projection on the sample face. Hence, according to the invention, as is schematically shown by FIGS. 4A–D, a conical dome is further formed at the tip of the lead-out electrode fabricated by the mechanical fabrication by the technology of FIB-CVD, and the conical dome is trimmed by etching of FIB to thereby fabricate an ideal shape of the tip of the lead-out electrode. As shown by FIG. 4A, carbon is deposited in a shape of a conical dome at a tip of the conical dome produced by mechanically fabricating a platinum foil by the conventional technology, by the FIB-CVD method using phenanthrene as the raw material gas. Here, deposition of carbon using phenanthrene is selected because the forming speed is far faster than that in the case of tungsten, which is advantageous for operation but the conical dome can also be formed by tungsten when a long period of time may be taken. In order to control the apex angle of the carbon dome, speed of reducing a diameter of the beam scanned by deflector may be adjusted. When the diameter of circular scanning is reduced by a constant rate, the more the carbon dome grow upwardly, the smaller the angle becomes and therefore, the ideal conical dome can be formed by accelerating the speed of reducing the diameter in accordance with the upward growth.

Figure 4B:
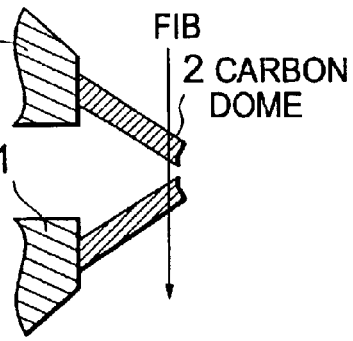
Figure 4C:
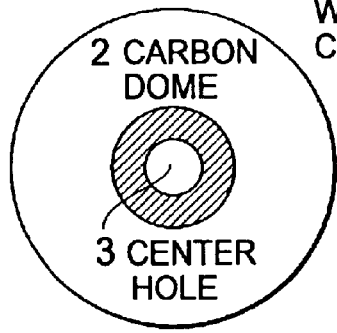
Figure 4D:
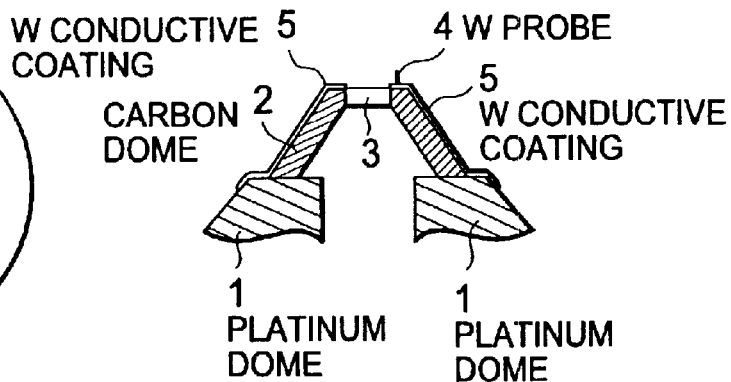
Figure 5:
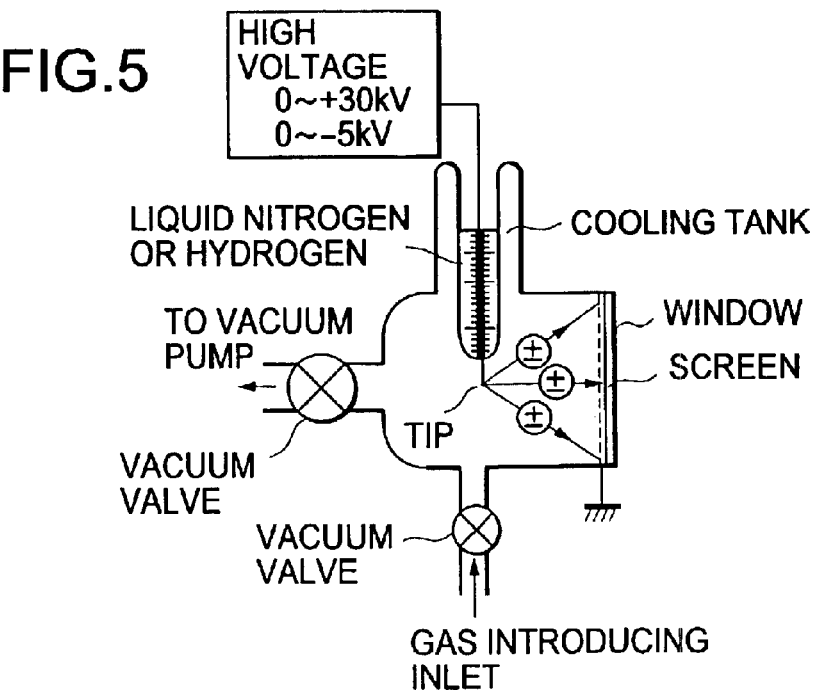
FIG. 5 is a basic constitution view for explaining a field emission microscope.
Figure 6:
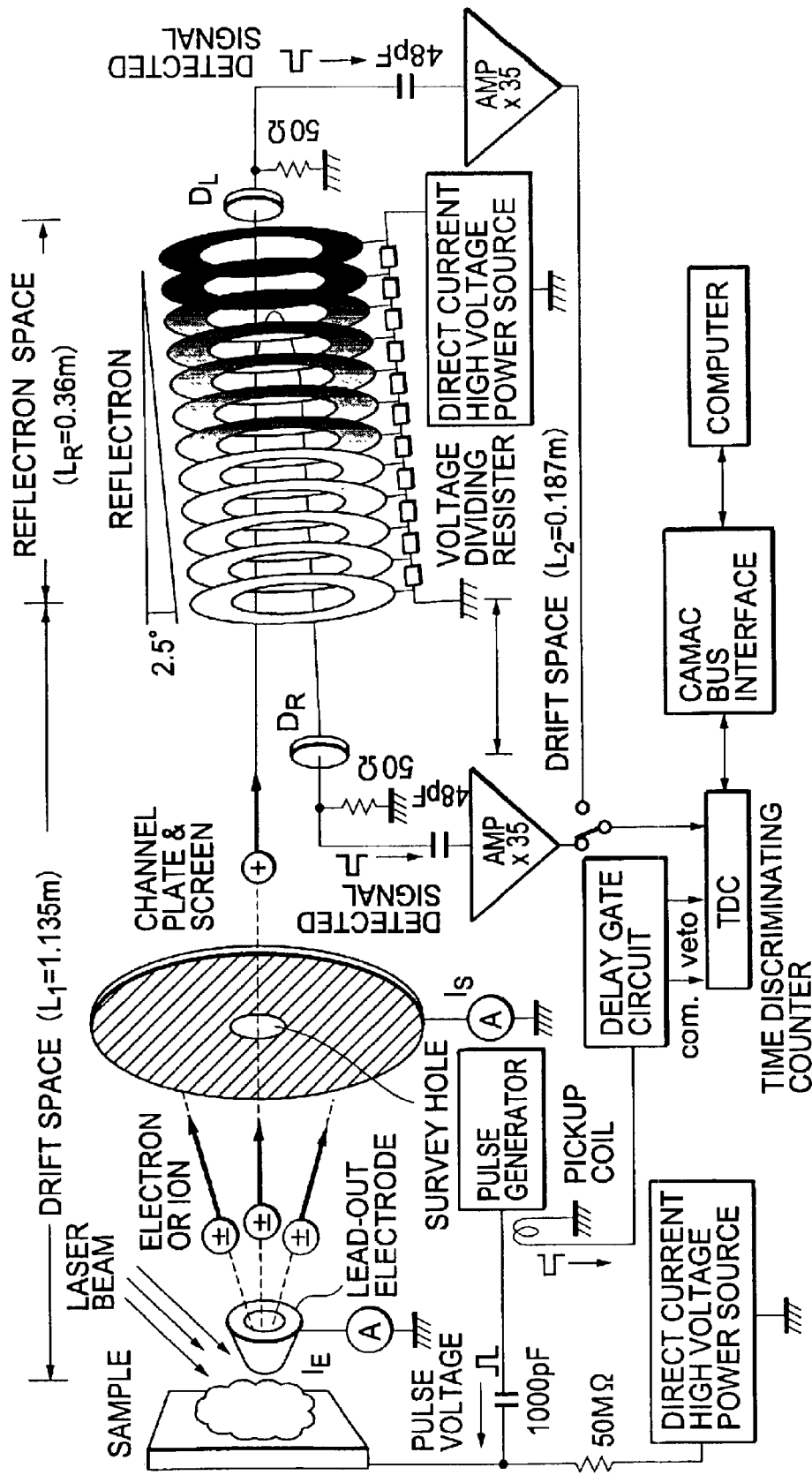
FIG. 6 is a basic constitution view for explaining a scanning atom probe.

When the conical carbon dome shown by FIG. 4A is formed at a tip of the platinum dome, as shown by FIG. 4B, the tip of the carbon dome is trimmed. That is, the tip of the dome is flattened by sputter etching by arranging the attitude of the lead-out electrode sideways and irradiating FIB from above. The tip is shaped by sputtering the tip and scanning the focused ion beam up to a position indicated by a bold line arrow mark in the drawing. Although a uniform layer is formed by deposition when scanning is carried out at equal speed, when there are recesses and projections at the platinum dome constituting a foundation, the influence remains. By flattening the dome tip, the center fall portion is neatly exposed. Next, the attitude of the lead-out electrode is recovered and the central portion of the tip of the carbon dome in a circular shape is shaped to a desired diameter. FIG. 4C shows a state of observing the tip from above at this occasion. The portion displayed in gray is a flattened circular-ring-like tip and inside thereof is the center hole portion where ionized atom passes through. The diameter of the center hole portion of the tip of the lead-out electrode fabricated and formed with the carbon dome, can be fabricated to be about 10 micrometers to several micrometers and micro-machining of an order smaller than that of the conventional mechanical fabrication by a digit can be realized.

Successively, an explanation will be given of a technology of forming a scanning probe of STM at the tip of the lead-out electrode fabricated by carrying out the micro-machining using the FIB-CVD technology. First, there is formed a conductive coating of tungsten at an area of the carbon dome over to the platinum dome constituting the foundation, formed at the tip of the lead-out electrode shown by FIG. 4C. The conductive coating is for ensuring high conductivity for detecting tunnel current via the probe of STM installed at the tip of the carbon dome. By carrying out FIB-CVD of tungsten, tungsten is deposited also at the center hole portion of the tip and the hole diameter is reduced and therefore, the perforating is carried out again. By carrying out FIB-CVD constituting the raw material gas by hexacarbonyl tungsten at the circular-ring-like tip by pinpoint irradiation under the state, there is formed a tungsten needle having a length of 1 $\mu$m or more and a tip diameter of about 100 nm as its dimensions. The lead-out electrode having the probe of STM formed in this way, is shown in the form of a schematic view in FIG. 4D.

Embodiment 1

There will be shown an embodiment of the invention fabricating an ideal composite type lead-out electrode by forming a finer conical dome on a conventional lead-out electrode and erecting an STM probe.

1. A tip of the conventional lead-out electrode is trimmed.
  [1] In a focused ion beam apparatus as shown by FIG. 7, the conventional lead-out electrode is set to be orthogonal to ion beam by driving a sample stage and the tip is machined by FIB sputtering to thereby flatten a surrounding of a hole. A range to be flattened is constituted by about 40 micrometers in a diameter thereof. A state of a total of the lead-out electrode in this case is as shown by the scanning ion microscope image of FIG. 1 and the state of the tip is as shown by FIG. 2.
  [2] The lead-out electrode is recovered to be horizontal as necessary and a hole having a diameter of 30 micrometers is finished by ion beam from above. When the hole has not been perforated at first, the hole is perforated by FIB at this stage. A time period taken for opening the hole having the diameter of 30 $\mu$m at a platinum foil having a thickness of 25 $\mu$m by Ga ion at 30 KeV, is about 0.5 through 1 hour.

2. A very small conical dome at a tip of which a hole is perforated is formed by subjecting carbon to FIB-CVD.

By applying a technology of forming a three-dimensional structure by FIB-CVD using phenanthrene as a raw material gas, the very small conical dome having the perforated hole is formed at the tip of the conventional lead-out electrode which has been trimmed as described above. The reason of selecting carbon is that a fabricating time period can be made shorter than that in depositing a metal such as tungsten by about 1 digit.
  [1] The lead-out electrode is set to be horizontal and a very small carbon conical dome is formed by CVD fabrication irradiating ion beam from above. At this occasion, in order to accelerate a speed of forming a structure, there is used an apparatus arranged with another gas gun at a symmetrical position with the ion beam as an axis. Ion beam current is set to 350 pA, a circular beam is scanned at 1000 rotation per second or more and a diameter of 36 micrometers is reduced to 4 $\mu$m slowly by taking 28 minutes from start. A wall thickness of a finished carbon dome is about 0.4 $\mu$m.
  [2] By bringing an attitude of the lead-out electrode to be orthogonal to ion beam, a tip of the carbon dome is trimmed by sputtering by FIB. Thereby, a circular-ring-shape portion of the tip of the carbon dome is made flat and made horizontal.
  [3] The attitude of the lead-out electrode is recovered to be horizontal and the hole at the tip of the carbon dome is fabricated again by FIB from above to finish the hole in a desired hole diameter.

3. The STM probe is formed by coating a conductive film on the carbon dome.
  [1] An attitude of the lead-out electrode is made horizontal relative to ion dome and a conductive film is coated by tungsten on the carbon dome and surrounding thereof by FIB-CVD fabrication using hexacarbonyl-tungsten as a raw material gas. Specifically, a symmetrically blowing gas gun is used, beam current is set to 1400 pA and a film of tungsten having sheet resistance of 20$\Omega$ (film thickness of about 0.1 $\mu$m) is coated in a range of 38 $\mu$m×38 $\mu$m. A time period of coating the film is about 15 minutes.
  [2] By depositing tungsten, the hole diameter of the center hole portion is reduced and therefore, the tip hole of the carbon dome is refabricated by sputter etching by using FIB from above to thereby shape the hole diameter to a design value.

[3] An STM probe is formed at one location on a circular ring at the tip of the carbon dome deposited with tungsten. Specifically, when the beam current is set to 0.4 pA and tungsten is deposited to a spot for two minutes, there is fabricated a tungsten needle having a height of 1.2 μm and a diameter of the tip of 100 nm or less. A tungsten needle having a little larger diameter may be formed by defocusing the beam or the like in order to increase mechanical strength of the needle as necessary. However, it has been confirmed that even the tungsten needle having the tip diameter of 100 nm or less is provided with a strength sufficient for taking an STM image.

Figure 3:
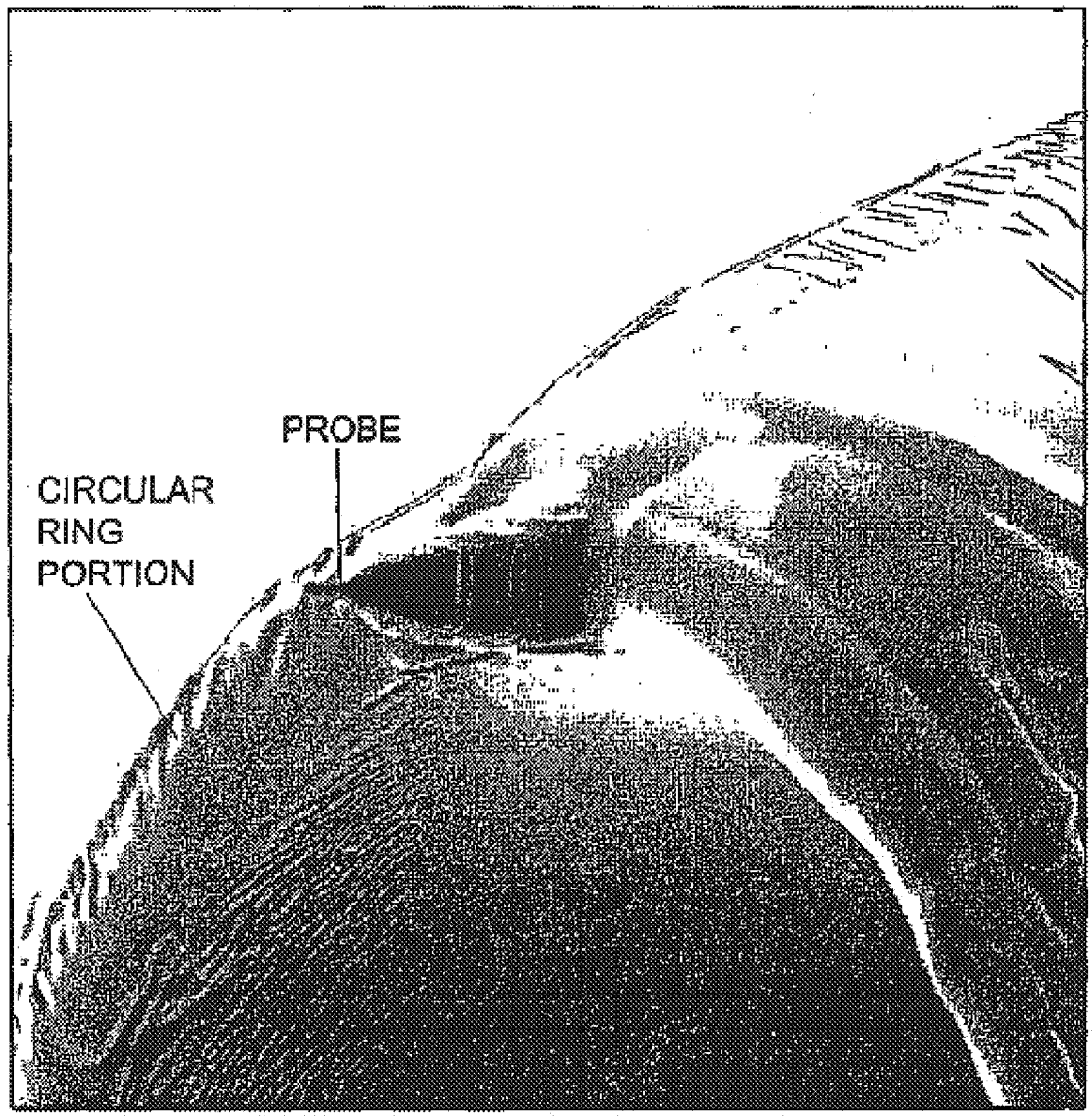
FIG. 3 shows a scanning ion microscope image of the tip of the lead-out electrode according to the invention formed with a carbon dome formed by an FIB-CVB process and an STM probe at the circular-ring-like tip.

By the above-described steps, there is formed the finer conical dome by FIB-CVD process at the tip of the conventional lead-out electrode produced by mechanical fabrication and the STM probe is erected by FIB-CVD process to thereby fabricate an ideal composite type lead-out electrode. What is shown in a microscope image of FIG. 3, is an enlarged image of a scanning ion microscope of the tip of the lead-out electrode fabricated in this way. A center black portion of the image having a sharpened shape is the STM probe and a portion thereof which looks in a shape of a circular arc on the left side is a circular-ring-like tip and an area continuing from the circular-ring-like tip in a right downward direction is the carbon dome fabricated by FIB-CVD process.

Embodiment 2

Next, there will be shown an embodiment of a system of a scanning atom probe having a function of a scanning tunneling microscope by using the ideal composite type lead-out electrode fabricated by the invention.

There is adopted the composite electrode according to the previous embodiment formed with a projection constituting an STM scanning probe at the circular ring portion of the tip of the lead-out electrode. The lead-out electrode is connected with means for detecting tunnel current flowing between the sample face and the STM probe. The detected tunnel current is stored and accumulated in a storage portion at inside of a computer in relation to a position of scanning the probe. The STM probe is installed at the tip of the lead-out electrode of SAP and therefore, a scanning mechanism of the lead-out electrode of SAP can serve also as a scanning mechanism of a probe of STM as it is. Information of a surface image of a sample provided by the STM function is displayed on a display. The image is comparable to a conventional microscope image of STM. An operator can observe the sample surface on the display and can select a very small projection suitable for an analyzed area of AP. There is provided a function of displaying a circular or rectangular index in correspondence with the analyzed area of AP on the display and specifying a selected area by means of a mouse or the like. When the analyzed area is specified on the display screen, the image portion is deduced in correspondence with probe position information. The position information is utilized successively as position information of AP and according to the invention, the probe position of STM is installed on the circular ring portion of the tip of the lead-out electrode of SAP and therefore, the positional relationship is uniquely determined. That is, according to the embodiment, since the diameter of the circular ring portion of the tip of the lead-out electrode is 4 μm and therefore, the position is shifted in a certain direction by an amount of 2 μm and the certain direction is constituted by an angle made by a position of installing the probe relative to a reference of the lead-out electrode. Therefore, the positional information of STM and the positional information of SAP are brought into a relationship of being always shifted from each other by the amount(deleted). The relationship is significantly facilitated in comparison with exchange of the positional information which is carried out between separate STM and SAP. According to the system, analyzed area information specified by an STM image on the display can be utilized as a scanning signal of the lead-out electrode of SAP as it is only by correcting an amount of a distance between the STM probe and a center of the circular ring on the circular ring. Although according to the embodiment, the lead-out electrode is not driven but the side of the sample stage is driven to scan since there is an attached member at the lead-out electrode, in principle, relative positions of the sample face and the lead-out electrode maybe changed and therefore, the lead-out electrode maybe driven to scan.

Further, since a position of a very small projection constituting an analyzed area in AP needs to adjust by a nanometer order, according to the embodiment, there is further provided a function of a field emission microscope (FEM). According thereto, although voltage applied to the sample is negative high voltage as AP, first, positive high voltage is applied thereto to thereby emit not ion but electron. In this way, an image of the field emission microscope is provided, adjustment of a position of a very small protection is executed and analysis by AP constituting a final object is executed. At that occasion, the tip of the lead-out electrode is sufficiently miniaturized by the fabricating method using focused ion beam and therefore, a function of limiting a range to be analyzed only to a specific projection on the sample, is significantly improved in comparison with the conventional system.

According to the scanning atom probe of the invention, by using the tip of the lead-out electrode of the scanning atom probe as the scanning probe of the scanning tunneling microscope (STM) and providing means for detecting tunnel current flowing between the sample and the lead-out electrode, the analyzed area can be selected from the STM image of the sample and therefore, the way of use of the scanning atom probe which has been difficult to specify the analyzed area conventionally, is remarkably improved.

Further, by adopting the scanning probe of STM forming the needle-like projection at the circular-ring-like tip of the lead-out electrode of the scanning atom probe by the micromachining technology such as a chemical deposition method or a lithographic method by using focused ion beam in order to promote resolution, there is provided an observed image having an excellent quality comparable to the microscope image provided inherently by using the STM apparatus.

The method of fabricating the lead-out electrode of the scanning atom probe according to the invention includes a step of constituting the funnel type member the tip of which is formed in the spherical shape from the metal foil by mechanical fabrication, a step of forming the conductive conical dome by the chemical deposition method using the focused ion beam at the tip of the funnel type member, and a step of forming the tip of the conical dome into the ideal shape by an accuracy of a submicron order or less by a sputtering method using the focused ion beam and therefore, an ultra fine structure which has been impossible to fabricate by the conventional mechanical fabrication can be fabricated and a substantially ideal shape of the tip of the lead-out electrode can be provided. Thereby, a very small projection proximate to other projections can be separated and analyzed and accuracy of AP can remarkably be promoted.

Further, the scanning atom probe system of the invention is provided with the composite electrode formed with the projection constituting the scanning probe of STM at the circular-ring-like tip of the lead-out electrode, the display for displaying the surface image of the sample provided by the STM function, means for selecting the analyzed area of the scanning atom probe (SAP)on the display and the drive mechanism for moving the sample or the lead-out electrode in correspondence with the selected positional information by the analyzed area selecting means, the probe position of STM corresponds to the specific position of the lead-out electrode of SAP and therefore, the positional information of STM uniquely corresponds to the positional information of SAP. Therefore, there is dispensed with operation of corresponding the positional information of STM and the positional information of SAP which is needed when the positional information of STM is positional information of the analyzed area provided by a separate STM apparatus and operational efficiency of analysis is promoted.

What is claimed:

1. A method of fabricating a micro extraction electrode of a scanning atom probe comprising: a step of forming a funnel-shaped member having a spherical tip from a metal foil by performing a mechanical fabrication process; a step of forming a hollow conductive conical dome at the tip of the funnel-shaped member by performing a chemical deposition method using a focused ion beam; a step of flattening the tip of the hollow conical dome by performing sputtering using a focused ion beam; and a step of forming a hole at a tip of the hollow conical dome with a desired diameter by performing sputtering using a focused ion beam.

2. A micro extraction electrode of a scanning atom probe formed according to the fabrication method of claim 1.

3. A micro extraction electrode of a scanning atom probe according to claim 2; further comprising a probe of a scanning tunneling microscope formed on the hollow conical dome by performing a chemical deposition process using a focused ion beam at the flattened tip of the hollow conical dome.

4. A micro extraction electrode of a scanning atom probe according to claim 3; wherein the conical hollow dome is formed of carbon.

5. A method of fabricating a micro extraction electrode of a scanning atom probe according to claim 1; wherein the step of forming the hollow conductive conical dome is performed by depositing carbon.

6. A method of fabricating a micro extraction electrode of a scanning atom probe according to claim 1; further comprising a step of forming a probe of a scanning tunneling microscope on the hollow conical dome by performing a chemical vapor deposition process using a focused ion beam at the flattened tip of the hollow conical dome.

7. A method of fabricating a micro extraction electrode of a scanning atom probe according to claim 6; further comprising a step of forming a conductive film on the hollow conical dome by performing a chemical vapor deposition process using a focused ion beam on the hollow conical dome before performing the step of forming a probe of a scanning tunneling microscope, so that the conductive film is electrically coupled to the probe of the scanning tunneling microscope.

8. A method of fabricating a micro extraction electrode of a scanning atom probe, comprising the steps of: forming a hollow conical member having a central opening at a tip thereof; forming a hollow conical dome at the tip of the hollow conical member by chemical deposition using a focused ion beam; flattening the tip of the hollow conical dome by sputtering using a focused ion beam; and forming a hole in the conical dome with a desired diameter by sputtering using the focused ion beam.

9. A method of fabricating a micro extraction electrode according to claim 8; wherein the step of forming a hollow conical member comprises the step of performing a mechanical machining process on a metal foil.

10. A method of fabricating a micro extraction electrode according to claim 8; wherein the step of forming a hollow conical member comprises the step of performing a mechanical machining process on platinum foil.

11. A method of fabricating a micro extraction electrode according to claim 8, wherein the step of forming a hollow conical dome at the tip of the hollow conical member comprises the step of depositing a carbon film on the hollow conical member.

12. A method of fabricating a micro extraction electrode according to claim 8; further comprising the step of forming a probe of a scanning tunneling microscope on the hollow conical dome by chemical vapor deposition using a focused ion beam at the flattened tip of the hollow conical dome.

13. A method of fabricating a micro extraction electrode according to claim 8; further comprising the step of forming a conductive film on the hollow conical dome by performing a chemical vapor deposition process using a focused ion beam on the hollow conical dome before performing the step of forming the probe of the scanning tunneling microscope, so that the conductive film is electrically coupled to the probe of the scanning tunneling microscope.

14. A micro extraction electrode of a scanning atom probe formed according to the fabrication method of claim 8.

15. A micro extraction electrode of a scanning atom probe according to claim 14; further comprising a probe of a scanning tunneling microscope formed on the hollow conical dome by chemical deposition using a focused ion beam at the flattened tip of the hollow conical dome.

* * * * *